April 30, 1946.  C. L. WRIGHT  2,399,419
SPRING LAY WIRE ROPE AND METHOD OF AND APPARATUS
FOR MANUFACTURING THE SAME
Filed July 14, 1943  3 Sheets-Sheet 1
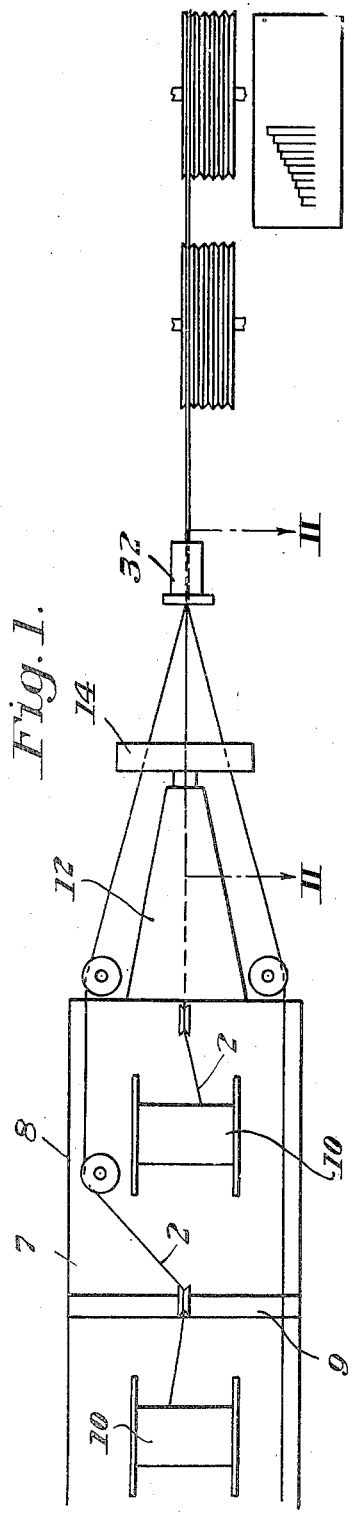
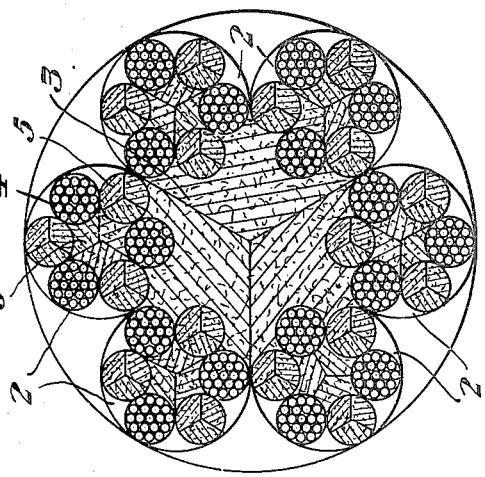
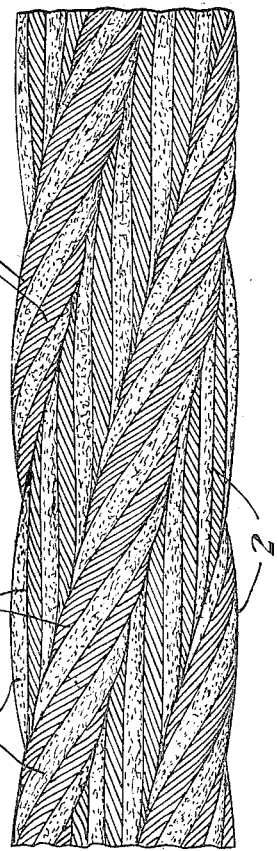
INVENTOR
CHARLES L. WRIGHT,
by John E. Jackson
his Attorney.

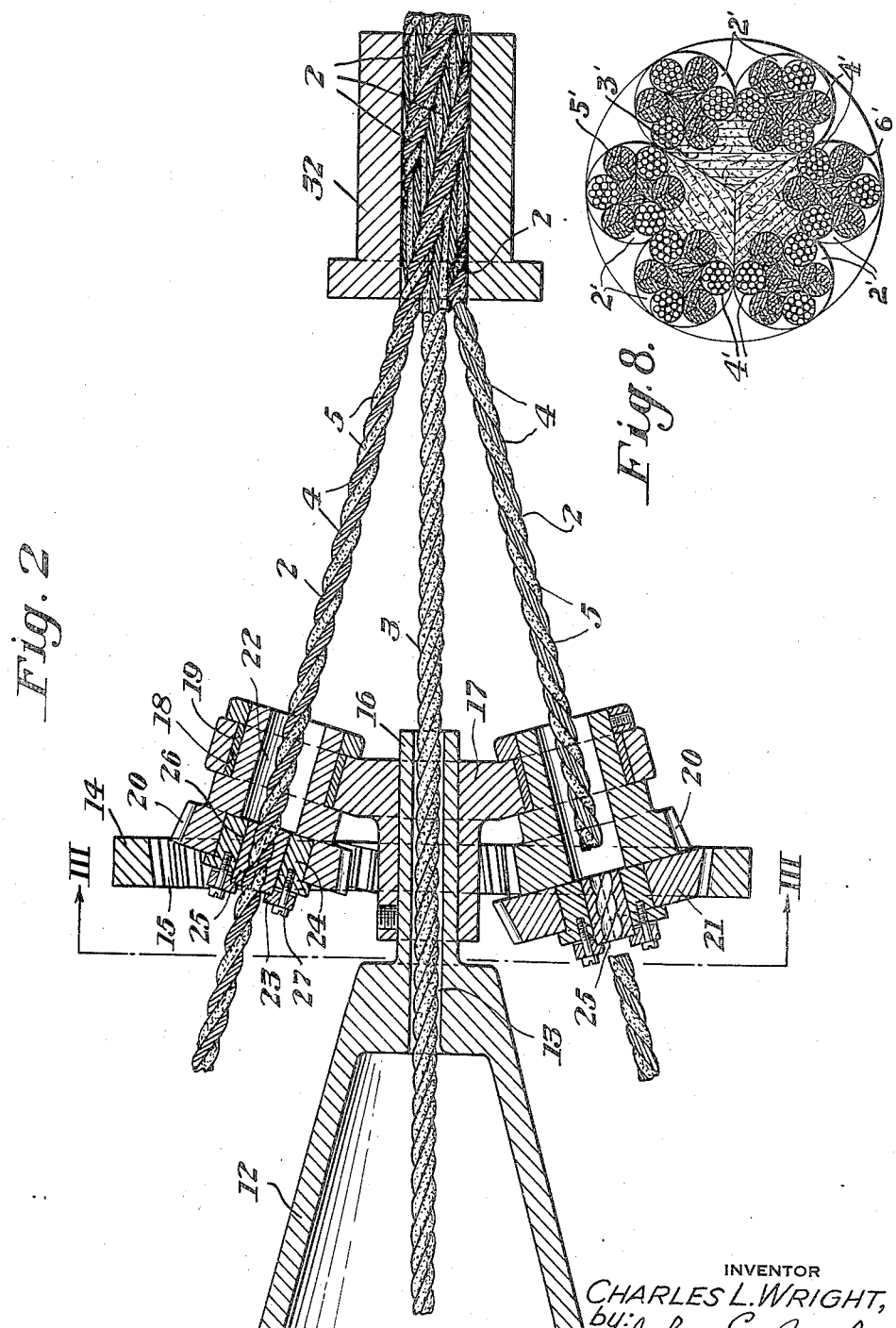

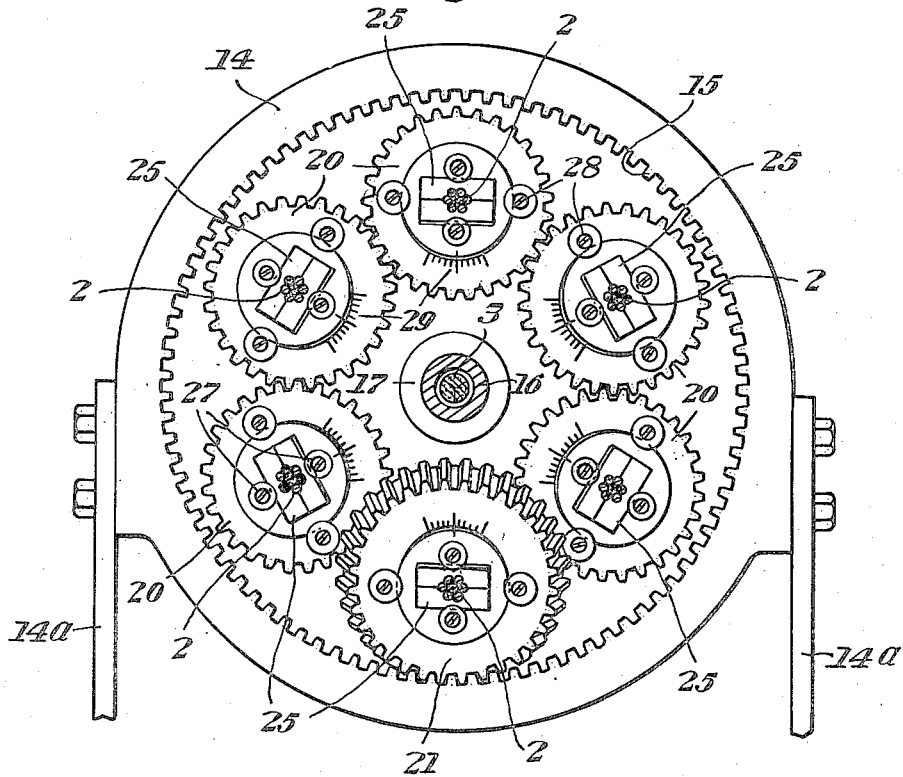
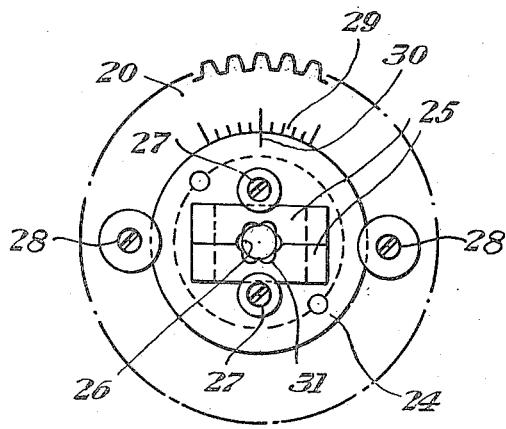
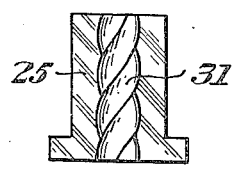

Patented Apr. 30, 1946

2,399,419

UNITED STATES PATENT OFFICE 2,399,419

SPRING LAY WIRE ROPE AND METHOD OF AND APPARATUS FOR MANUFACTURING THE SAME

Charles L. Wright, Branford, Conn., assignor to The American Steel and Wire Company of New Jersey, a corporation of New Jersey Application July 14, 1943, Serial No. 494,731

16 Claims. (Cl. 57—59)

This invention relates to improvements in spring lay wire rope generally employed for mooring lines, running ropes, towing lines and the like, and to an improved method of and apparatus for manufacturing the same.

Spring lay wire rope generally comprises a composite structure of steel and hemp designed for high flexibility whereby the same may be readily subjected to small radius bends, and is further characterized by being of smaller size than an all-hemp rope of equivalent strength thereby helping to conserve vital hemp supplies.

While the hemp elements or strands in such a rope tend to cushion and protect the steel strands, the latter sometimes fracture due to interfering contact with each other and the saw tooth action of the steel strands across each other, causing nicks, abrasion or shearing of the individual steel wires. This possibility of failure is critical due to the potential loss and danger attendant upon failure of such ropes in their field of use.

Accordingly, it is the general object of this invention to provide a spring lay wire rope wherein the relation of the lay of the steel strands of adjacent composite strands relative to each other or to the hemp strands is improved whereby the possibility of failure by interference of the steel strands with each other is eliminated.

It is a more specific object of the invention to provide an improved spring lay wire rope particularly of the reverse lay type wherein one of the strands of each of the composite strands tangentially contacts solely one strand of an adjacent composite strand throughout the length of the rope whereby any saw tooth action or interference of one steel strand of any particular composite strand on another steel strand of an adjacent composite strand is eliminated.

It is a further object of this invention to provide an improved spring lay wire rope particularly of the reverse lay type, wherein one of the steel strands of each of the composite strands tangentially contacts solely one of the hemp strands of an adjacent composite strand throughout the length of the rope so as to provide a cushioning effect for the steel strands thereby eliminating any interference of the steel strands with each other.

It is still another object of my invention to provide an improved mechanism or apparatus which can be conveniently incorporated with conventional type rope laying machines for laying the composite strands so that one of the strands of each of the composite strands tangentially contacts solely one strand of an adjacent composite strand throughout the length of the completed rope.

It is still a further object of the present invention to provide an improved method of laying the composite strands of a spring lay wire rope by controlling the lay or pitch of the composite strands as they are laid into position about a core element so that one of the strands of each of the composite strands contacts solely one strand of an adjacent composite strand throughout the length of the completed rope.

Various other objects and advantages of this invention will be more apparent in the course of the following specification and will be particularly pointed out in the appended claims.

In the accompanying drawings there is shown, for the purpose of illustration, one embodiment and a modification thereof which my invention may assume in practice.

In these drawings:

Figure 1 is a schematic plan view of a conventional type rope laying machine showing the improved layer head of my invention incorporated therewith;

Figure 2 is an enlarged sectional view taken on line II—II of Figure 1;

Figure 3 is a sectional view taken on line III—III of Figure 2;

Figure 4 is a detail view showing the die assembly of my invention;

Figure 5 is a detail view of one part of the die;

Figure 6 is a plan view of one modification of the improved spring lay rope of my invention;

Figure 7 is a cross-sectional view thereof; and

Figure 8 is a cross-sectional view of another modification of the improved spring lay rope of my invention.

Referring to Figures 6 and 7 of the drawings, the modification of the rope there illustrated is a spring reverse lay rope, wherein a plurality of alternate left and right lay composite strands 2 which are helically wound in right lay about a main central core 3 or other similar material. Each composite strand consists of alternate individual steel wire strands 4 and fiber or hemp strands 5 which are alternate left and right lay about central strand cores 6 of hemp or the like. The steel strands 4 are each composed of a plurality of wires in opposite lays in alternate composite strands 2.

According to the present invention, all of the strands, both the composite strands 2 and their individual strands 4 and 5, are helically wound, and by relating the lay thereof as described, the individual strands of the composite strands are disposed so that one of the strands of each of the composite strands tangentially contacts solely one strand of an adjacent composite strand throughout the length of the rope. The composite strands 2 in the embodiment shown in Figures 6 and 7 are laid so that one of the steel strands 4 of each of the composite strands tangentially contacts solely one of the hemp strands 5 of an adjacent composite strand throughout the length of the rope. By providing such an arrangement, it will be seen that the individual steel strands of any one composite strand will not contact the steel strands of an adjacent composite strand but will contact solely a hemp strand of an adjacent composite strand all along the ropes. It will also be understood that the steel strands will always be embedded in the hemp strands thereby preventing any saw tooth action of the steel strands of one composite strand against those of an adjacent composite strand, consequently eliminating undue wear on the steel strands. In some cases, it may be desirable to provide a rope wherein the steel strands of each of the composite strands contact the steel strands of an adjacent composite strand, and in such case, it will be seen that the steel strands of the composite strands are disposed so that one of the steel strands of each of the composite strands tangentially contacts solely one of the steel strands of an adjacent composite strand throughout the length of the rope. While such a construction is not as desirable as the preferred embodiment, in that the steel strands of an adjacent composite strand contact each other and subject them to greater wear, it will be seen that this is only tangential or point contact, and that there is no saw tooth action transversely of the steel strands as in the case of a conventional wire rope.

Such second modification of the rope of my invention is illustrated in Figure 8, wherein the parts similar to those shown in Figure 7 are designated by the same reference characters primed. Thus in the latter modification the composite strands 2' are laid so that one of the steel strands 4' of each of the composite strands contacts solely one of the steel strands 4' of an adjacent composite strand throughout the length of the rope. The cable shown in Figure 8 likewise employs a main central core, designated 3', fiber or hemp strands 5' which alternate with steel strands 4' in the composite strands 2', and central strand cores 6' of hemp or the like within the composite strands.

Attention is now directed to Figures 1 through 5 of the drawings, in which there is shown my improved apparatus for manufacturing the improved spring lay wire rope of my invention. My improved apparatus may be incorporated with a conventional type rope laying machine 7 which consists generally of a rotating standard or flyer 8, carrying spiders 9 in which are mounted bobbin frames for carrying bobbins 10, upon which the composite strands 2 are reeled. On one end of the flyer or rotatable member 8, there is arranged a conical-shaped member 12 having an opening 13 arranged in the outer end thereof, axially of the machine through which the core 3 is adapted to pass in a well known manner.

According to the present invention, there is arranged at a point adjacent the outer end of the conical-shaped member 12, the improved laying head of my invention. This laying head comprises a fixed annular member 14 having teeth 15 arranged around the inner periphery thereof so as to provide a stationary internal gear. This annular member may be rigidly supported by vertical supporting members 14ᵃ or in any other suitable manner. There is securely arranged on a cylindrical extension 16, disposed on the outer end of the conical-shaped member 12, preferably an adjustable circular supporting member 17, in which there is concentrically arranged a plurality of holes 18, six in the present instance, preferably having a bushing 19 disposed in each of them. There is journaled in each of the bushings 19 in the holes 18, a gear 20 which inter-mesh with each other. On the inner end of one of the gears 20, there is securely arranged a bevel gear 21 which meshes with the teeth 15 of the stationary internal gear 14.

As more clearly shown in Figures 2, 3, and 4 of the drawings, there is arranged through each of the gears 21 axially thereof, an opening 22 in which there is disposed a die assembly 23. Each of the die assemblies 23 consists, preferably, of a bushing 24 within which there is disposed, preferably, a two-part square die 25 so as to provide substantially a cylindrical opening 26 therethrough. The two-part die 25 is held in position in the bushing, preferably by means of machine screws 27 with one positioned to each side of the die diametrically opposite each other so that the die may be adjusted in or removed from the bushings. The bushing 24 is held in adjustable position in the end of the gear, preferably by means of machine screws 28 with one arranged to either side thereof diametrically opposite each other. On the face of each of the gears 20 around the opening 22 therethrough, there is arranged, preferably a scale or calibrations 29 which are adapted to cooperate with a hair-line 30 arranged on the face of the respective bushing 24 positioned therein. It will be understood that such an arrangement is provided so as to accurately adjust angularly the bushing 24, together with the die 25 carried thereby, in the proper position in the gear for a purpose hereinafter to be described. The inner walls of the two-part die 25, which form the opening 26 therethrough as shown in Figure 5, are helically grooved as at 31 with the pitch of helices corresponding to the helical arrangement of the strands 4 and 5 about the core 6 in each of the composite strands 2.

The improved apparatus of my invention functions in the following manner when making the rope shown in Figures 6 and 7. The core 3 is inserted through the hole 13 and the extension 16 in the outer end of the conical-shaped member 12 and through the closing die 32 to the haul-off drum (not shown). The haul-off mechanism may be of the conventional type, but is preferably the standard change gear type. The composite strands 2 are then threaded through the opening 26 in the die 25 and disposed around the core 3 through the closing die 32 and connected to the haul-off drum for pulling the strands and core through the closing die to form the rope and to reel the same. Each of the dies 25 are then properly positioned in the respective gears 20 by loosening the machine screws 28 and turning the bushing 24 to the proper angular arrangement desired by noting the calibrations on the face of the gears, so that they are properly positioned in order that each of the composite strands 2 will be properly laid about the core 3. In other words, the dies 25 are positioned so that one of the strands of each of the composite strands 2 is laid so as to tangentially contact solely one of the strands of an adjacent composite strand as the same are laid about the core 3 at the closing die 32. The machine screws 28 are then tightened so as to securely hold the bushings 24 together with the dies 25 carried thereby, securely in position, and the machine is now ready for laying the rope.

The closing machine is now set in operation and as the rotatable member or flyer 8 rotates, it will be understood that the conical-shaped member 12 carried thereby, rotates therewith. Also upon rotation of the conical-shaped member 12, the circular supporting member 17 attached thereto will also rotate. Upon rotation of the supporting member 17, it will be seen that each of the gears 20 rotates relative thereto and to each other due to the action of the gear 21 which cooperates with the stationary internal gear 14. It will be seen that upon such rotation of the supporting member 17 and each of the gears 20, that the composite strands 2 will be helically wound around the core 3 at the closing die 32, as all of the strands together with the core 3, are pulled therethrough by the haul-off mechanism. As the composite strands 2 pass through the dies 25, it will be seen that the helical grooves 31 arranged therein cooperate with the individual strands 4 and 5 of the composite strands so as to properly guide the same to the closing die 32 so as to insure proper laying of the composite strands about the core 3 in order to provide the cable of my invention. In other words, the grooves in the dies 25 will prevent the composite strands from twisting therein so that the strands will be properly laid relative to each other so that one individual strand of a composite strand will be disposed tangentially against one of the strands of an adjacent composite strand throughout the laying or closing of the strands. It will be understood that as the flyer rotates, the haul-off drum turns simultaneously to determine the pitch or lay of the rope.

As a result of my invention, it will be seen that there is provided an apparatus in which there is a positive control over the lay of the strands in order that proper lay thereof is insured so as to properly close the same to obtain a rope of the desired construction. In order to obtain the desired result, it will be understood that the speed of the closing machine must be proper with respect to the speed of the haul-off drum, depending on the pitch of the composite strands. If the strands are not properly laid relative to each other in order to obtain the desired result, it will be seen that the dies 25 may be conveniently adjusted in order to insure proper closing of the strands at the closing die 32 so as to obtain the wire rope of the present invention.

While I have shown and described specific embodiments of my invention, it will be understood that these embodiments are merely for the purpose of illustration and description and that various other forms may be devised within the scope of my invention, as defined in the appended claims.

I claim:

1. A spring lay wire rope including a plurality of composite strands formed of individual steel strands and hemp strands, the individual strands of said composite strands disposed so that one of the strands of each of the composite strands tangentially contacts solely one strand of an adjacent composite strand throughout the length of the rope.

2. A spring lay wire rope including a plurality of composite strands formed of individual steel strands and hemp strands, the individual strands of said composite strands disposed so that one of the steel strands of each of the composite strands tangentially contacts solely one of the hemp strands of an adjacent composite strand throughout the length of the rope.

3. A spring lay wire rope including a plurality of composite strands formed of individual steel strands and hemp strands, the individual strands of said composite strands disposed so that one of the steel strands of each of the composite strands tangentially contacts solely one of the steel strands of an adjacent composite strand through the length of the rope.

4. A spring reverse lay wire rope including a plurality of composite strands wound about a core, said composite strands comprising alternate steel strands and hemp strands and disposed in opposite lay in alternate composite strands, the individual strands of said composite strands disposed so that one of the strands of each of the composite strands tangentially contacts solely one strand of an adjacent composite strand throughout the length of the rope.

5. A spring reverse lay wire rope including a plurality of composite strands wound about a core, said composite strands comprising alternate steel strands and hemp strands and disposed in opposite lay in alternate composite strands, the individual strands of said composite strands disposed so that one of the steel strands of each of the composite strands tangentially contacts solely one of the hemp strands of an adjacent composite strand throughout the length of the rope.

6. A spring reverse lay wire rope including a plurality of composite strands wound about a core, said composite strands comprising alternate steel strands and hemp strands and disposed in opposite lay in alternate composite strands, the individual strands of said composite strands disposed so that one of the steel strands of each of the composite strands tangentially contacts solely one of the steel strands of an adjacent composite strand throughout the length of the rope.

7. In a rope laying machine for manufacturing spring lay wire rope which consists of a plurality of composite strands formed of individual steel strands and hemp strands helically wound around a core, a die member through which the composite strands together with the core are drawn, a stationary gear ring having gear teeth arranged around the inner periphery thereof, rotatable means arranged adjacent said ring gear, a plurality of rotatable guide members through each of which a composite strand passes, said guide members being concentrically arranged on said rotatable means within said ring gear, each guide member having means for preventing rotation of the strand passing therethrough with respect to the guide member when the strand is held stationary in a longitudinal direction relative to the guide member whereby the composite strands are helically wound around the core at said first mentioned die member upon rotation of said rotatable means, and a gear arranged with each of said rotatable die members which meshes with each other and another gear arranged with one of said rotatable die members which meshes with the teeth on the inner periphery of said ring gear whereby the die members are rotated upon rotation of said rotatable means, said rotatable die members adapted to guide and control the lay of each of the composite strands whereby the individual strands thereof are positioned at said first mentioned die so that one of the strands of each of the composite strands tangentially contacts solely one strand of an adjacent composite strand throughout the length of the rope as the same is continuously laid.

8. In a rope laying machine for manufacturing spring lay wire rope which consists of a plurality of composite strands formed of individual steel strands and hemp strands helically wound around a core, a die member through which the composite strands together with the core are drawn, a stationary gear ring having gear teeth arranged around the inner periphery thereof, rotatable means arranged adjacent said gear ring concentric therewith, a plurality of rotatable guide members through each of which a composite strand passes, said guide members being concentrically arranged on said rotatable means within said ring gear, each guide member having means for preventing rotation of the strand passing therethrough with respect to the guide member when the strand is held stationary in a longitudinal direction relative to the guide member whereby the composite strands are helically wound around the core at said first mentioned die member upon rotation of said rotatable means, a gear arranged with each of said rotatable die members which meshes with each other and another gear arranged with one of said rotatable die members which meshes with the teeth on the inner periphery of said ring gear whereby the die members are rotated upon rotation of said rotatable means, a haul-off means for pulling all of the composite strands together with the core through all of said die members, the speed of said haul-off means and said rotatable die members being corelated whereby the individual strands of the composite strands are guided and controlled as they pass to said first mentioned die members so that one of the strands of each of the composite strands tangentially contacts solely one strand of an adjacent composite strand at the laying die throughout the length of the rope as the same is continuously laid.

9. In the manufacture of spring reverse lay wire rope including a plurality of composite strands formed of individual steel strands and hemp strands helically wound around a core, the step which includes laying the individual composite strands around the core so that one of the strands of each of the composite strands tangentially contacts solely one strand of an adjacent composite strand throughout the length of the rope as the same is continuously laid.

10. In the manufacture of spring reverse lay wire rope including a plurality of composite strands formed of individual steel strands and hemp strands helically wound around a core, the steps which include pulling the composite strands together with the core member through a die member whereby the composite strands are helically wound around the core at said die member, and delivering the individual strands of the composite strands to said die member so that one of the strands of each of the composite strands tangentially contacts solely one strand of an adjacent composite strand throughout the length of the rope as the same is continuously laid.

11. In a rope laying machine for manufacturing spring lay wire rope which consists of a plurality of composite strands formed of individual steel strands and hemp strands helically wound around a core, a die member through which the composite strands together with the core are drawn, a rotatable means positioned forwardly of said die member through which the composite strands pass whereby the same are helically wound around the core at said die member, a plurality of rotatable guide members carried by said rotatable means, one such guide member being provided for each composite strand, for guiding and controlling the lay of each of said composite strands, each guide member having means for preventing rotation of the strand with respect thereto when the strand is held stationary in a longitudinal direction relative to the guide member, a haul-off means for drawing the completed wire rope through the first named die, and means for driving the haul-off means, rotatable means, and rotatable guide members at such speeds with respect to each other and to the pitch of the individual composite strands that the individual strands of the completed wire rope are positioned at the first named die so that one of the strands of each of the composite strands tangentially contacts solely one strand of an adjacent composite strand throughout the length of the rope as the same is continuously laid.

12. In a rope laying machine for manufacturing spring lay wire rope which consists of a plurality of composite strands formed of individual steel strands and hemp strands helically wound around a core, a die member through which the composite strands together with the core are drawn, a rotatable means positioned forwardly of said die member through which the composite strands pass whereby the same are helically wound around the core at said die member, a plurality of rotatable guide members carried by said rotatable means, one such guide member being provided for each composite strand, for guiding and controlling the lay of each of said composite strands, each guide member having means keying it to its strand along a helical path corresponding to the pitch of the strand, means for rotating said guide members in such direction that the members receive and guide the composite strands without substantial twisting of the same, a haul-off means for drawing the completed wire rope through the first named die, and means for driving the haul-off means and the rotatable means at such speeds with respect to each other and to the speed of rotation of the guide members and the pitch of the individual composite strands that the individual strands of the completed rope are positioned at said first named die so that one of the strands of each of the composite strands tangentially contacts solely one strand of an adjacent composite strand throughout the length of the rope as the same is continuously laid.

13. In a rope laying machine for manufacturing spring lay wire rope which consists of a plurality of composite strands formed of individual steel strands and hemp strands helically wound around a core, a die member through which the composite strands together with the core are drawn, a rotatable means positioned forwardly of said die member through which the composite strands pass whereby the same are helically wound around the core at said die member, a plurality of rotatable guide members concentrically arranged on said rotatable means, one such guide member being provided for each composite strand, with a composite strand adapted to pass through each of said guide members, each guide member having at least one helical groove therein to interfit with a strand of the composite strand passing therethrough and thus to guide and control the lay of the composite strand, means to rotate the guide members in such direction as to receive and guide the composite strands without substantial twisting of the same, a haul-off means for drawing the completed wire rope through the first named die, and means for driving the haul-off means and rotatable means at such speeds with respect to each other and to the speed of the rotatable guide members and the pitch of the individual composite strands that the individual strands of the completed wire rope are positioned at the first mentioned die so that one of the strands of each of the composite strands tangentially contacts solely one strand of an adjacent composite strand throughout the length of the rope as the same is continuously laid.

14. In a rope laying machine for manufacturing spring lay wire rope which consists of a plurality of composite strands formed of individual steel strands and hemp strands helically wound around a core, the combination, as defined in claim 11, including means for adjusting angularly the position of each of said rotatable guide members relative to its driving means.

15. In a rope laying machine for manufacturing spring lay wire rope which consists of a plurality of composite strands formed of individual steel strands and hemp strands helically wound around a core, the combination, as defined in claim 12, including means for adjusting angularly the position of each of said rotatable guide members relative to its driving means.

16. In a rope laying machine for manufacturing spring lay wire rope which consists of a plurality of composite strands formed of individual steel strands and hemp strands helically wound around a core, the combination, as defined in claim 13, including means for adjusting angularly the position of each of said rotatable guide members relative to its driving means.

CHARLES L. WRIGHT.